United States Patent
Morishita et al.

(10) Patent No.: US 10,786,730 B2
(45) Date of Patent: Sep. 29, 2020

(54) TERMINAL DEVICE FOR GAME APPLICATION USING VARIOUS OBJECTS WITH OBJECT ATTRIBUTE INFORMATION

(71) Applicant: GungHo Online Entertainment, Inc., Tokyo (JP)

(72) Inventors: Kazuki Morishita, Tokyo (JP); Akihiro Nara, Tokyo (JP); Shin Yamamoto, Tokyo (JP); Kento Takeda, Tokyo (JP)

(73) Assignee: GungHo Online Entertainment, Inc. (JP)

( * ) Notice: Subject to any disclaimer, the term of this patent is extended or adjusted under 35 U.S.C. 154(b) by 111 days.

(21) Appl. No.: 15/883,245

(22) Filed: Jan. 30, 2018

(65) Prior Publication Data
US 2019/0099664 A1    Apr. 4, 2019

Related U.S. Application Data

(63) Continuation of application No. PCT/JP2017/035769, filed on Oct. 2, 2017.

(51) Int. Cl.
*A63F 13/2145* (2014.01)
*G06F 3/0484* (2013.01)
(Continued)

(52) U.S. Cl.
CPC .......... *A63F 13/2145* (2014.09); *A63F 13/80* (2014.09); *A63F 13/822* (2014.09);
(Continued)

(58) Field of Classification Search
CPC ............................ A63F 13/2145; A63F 13/882
(Continued)

(56) References Cited

U.S. PATENT DOCUMENTS 7,722,452 B2 * 5/2010 Miura ................... A63F 13/10
463/9
8,177,622 B2 * 5/2012 Englman ................. G07F 17/34
463/16
(Continued)

FOREIGN PATENT DOCUMENTS

JP    2008-246076 A    10/2008
JP    5755785 B1    7/2015
(Continued)

OTHER PUBLICATIONS

"Getting started with game creating" Programming "Plattacchi", [online], Jun. 22, 2014, YouTube, [retrieved Dec. 18, 2017], Internet <URL: https:www.youtube.com/watch?v=VMZYNxuhuL0>.

*Primary Examiner* — Chase E Leichliter
(74) *Attorney, Agent, or Firm* — Harness, Dickey & Pierce, P.L.C.

(57) ABSTRACT

A terminal device includes a display for displaying first and second objects, a memory for storing computer-readable instructions and object attribute information of the first and second objects, and a processor for executing configured to execute the computer-readable instructions. The processor selects one of the first objects, moves the selected first object to another position, and display the second object on the display at an arrangement position of an adjacent series of ones of the first objects when the object attribute information of the adjacent series of ones of the first objects have a predetermined relationship.

19 Claims, 12 Drawing Sheets

(51) Int. Cl.
  *G06F 3/0488* (2013.01)
  *A63F 13/80* (2014.01)
  *A63F 13/822* (2014.01)

(52) U.S. Cl.
  CPC ........ *G06F 3/0488* (2013.01); *G06F 3/04842* (2013.01); *G06F 3/04845* (2013.01)

(58) Field of Classification Search
  USPC ............................................................ 463/9
  See application file for complete search history.

(56) References Cited

U.S. PATENT DOCUMENTS

| | | | | |
|---|---|---|---|---|
| 8,328,611 | B2* | 12/2012 | Sano | A63F 13/2145 463/31 |
| 9,120,010 | B2* | 9/2015 | Karn | A63F 13/00 |
| 9,682,322 | B2* | 6/2017 | Suzuki | A63F 13/58 |
| 9,687,729 | B2* | 6/2017 | Hansson | A63F 13/2145 |
| 9,757,646 | B2* | 9/2017 | Dumitrescu | A63F 13/2145 |
| 10,195,534 | B2* | 2/2019 | Kushner | A63F 13/822 |
| 2007/0060235 | A1* | 3/2007 | Miura | A63F 13/2145 463/9 |
| 2009/0275372 | A1* | 11/2009 | Prucey | A63F 9/10 463/9 |
| 2012/0322556 | A1* | 12/2012 | Rogers | A63F 13/53 463/37 |
| 2013/0331162 | A1* | 12/2013 | Krivicich | A63F 13/426 463/10 |
| 2014/0171166 | A1* | 6/2014 | Merari | A63F 13/80 463/9 |
| 2014/0235306 | A1* | 8/2014 | Walls | A63F 13/20 463/9 |
| 2014/0287830 | A1* | 9/2014 | Katou | A63F 13/79 463/31 |
| 2014/0302935 | A1* | 10/2014 | Royce | A63F 13/44 463/42 |
| 2014/0342791 | A1* | 11/2014 | Hugh | A63F 13/80 463/9 |
| 2014/0370949 | A1* | 12/2014 | Beppu | A63F 13/80 463/9 |
| 2014/0370950 | A1* | 12/2014 | Hansson | A63F 13/23 463/9 |
| 2015/0238861 | A1* | 8/2015 | Inamori | A63F 13/5375 463/31 |
| 2015/0321087 | A1* | 11/2015 | Dumitrescu | A63F 13/42 463/31 |
| 2016/0023115 | A1* | 1/2016 | Takeda | A63F 13/822 463/31 |
| 2016/0059119 | A1* | 3/2016 | Kamobayashi | A63F 13/426 463/9 |
| 2016/0089602 | A1* | 3/2016 | Frostberg | A63F 13/426 463/31 |
| 2016/0089603 | A1* | 3/2016 | Frostberg | A63F 13/822 463/31 |
| 2016/0139773 | A1* | 5/2016 | Kodisoja | A63F 13/46 463/33 |
| 2016/0151703 | A1* | 6/2016 | Lee | A63F 13/426 463/9 |
| 2016/0279518 | A1* | 9/2016 | Shimono | A63F 13/00 |
| 2017/0209785 | A1* | 7/2017 | Park | A63F 13/35 |
| 2018/0147499 | A1* | 5/2018 | Braunisch | A63F 13/92 |
| 2018/0188940 | A1* | 7/2018 | Pauna | A63F 13/426 |

FOREIGN PATENT DOCUMENTS

| | | |
|---|---|---|
| JP | 2015-167707 A | 9/2015 |
| JP | 2016-007530 A | 1/2016 |

* cited by examiner

TERMINAL DEVICE FOR GAME APPLICATION USING VARIOUS OBJECTS WITH OBJECT ATTRIBUTE INFORMATION

CROSS-REFERENCE TO RELATED APPLICATIONS

The present application is a continuation application of International Application No. PCT/JP2017/035769, filed on Oct. 2, 2017, the contents of this application is incorporated herein by reference in its entirety.

BACKGROUND

1. Technical Field

The present disclosure relates to a terminal device, a program, and a method capable of executing an application executed by moving an object arranged on a board surface displayed on a display.

2. Related Art

Conventionally, terminal devices capable of executing a puzzle game application are known, in which objects arranged on a board surface displayed on a display are moved by an instruction input by a user, and when objects of the same color are adjacent to each other, both the objects are deleted from the board surface. Japanese Patent Publication No. 2016-007530 describes an electronic game device that deletes puzzle pieces that satisfy a predetermined condition when arrangement of the puzzle pieces satisfy the predetermined condition by movement of a puzzle piece by a user.

SUMMARY

In view of the foregoing, the present disclosure provides a terminal device, a program, and a method capable of executing an application more convenient for a user according to various embodiments.

According to one aspect of the present disclosure, there is provided "a terminal device comprising: a display configured to display a plurality of first objects and a board on which the first objects are arranged; a memory configured to store a computer-readable instructions and attribute information of objects comprising the first objects; an input interface configured to select one first object out of the plurality of first objects, and accept an input by a user for moving the selected first object to an arbitrary position on the board; and a processor configured to execute the computer-readable instructions so as to: when a plurality of the first objects having the attribute information having a predetermined relationship is arranged in series by movement of the selected first object on the basis of the input, display a second object different from the first objects in series at a position corresponding to an arrangement position of the first objects in series".

According to one aspect of the present disclosure, there is provided "computer program product embodying computer-readable instructions stored on a non-transitory computer-readable storage medium for causing a computer to execute a process by a processor, the computer comprising: a display configured to display a plurality of first objects and a board on which the first objects are arranged, a memory configured to store attribute information of objects comprising the first objects, and an input interface configured to select one first object out of the plurality of first objects, and accept an input by a user for moving the selected first object to an arbitrary position on the board, the computer configured to perform the steps of: when a plurality of the first objects having the attribute information having a predetermined relationship is arranged in series by movement of the selected first object on the basis of the input, processing for displaying a second object different from the first objects in series at a position corresponding to an arrangement position of the first objects in series."

According to one aspect of the present disclosure, there is provided "a method performed for causing a processor in a computer to execute a process, the computer comprising: a display configured to display a plurality of first objects and a board on which the first objects are arranged, a memory configured to store the computer-readable instructions and attribute information of objects comprising the first objects, and an input interface configured to select one first object out of the plurality of first objects, and accept an input by a user for moving the selected first object to an arbitrary position on the board, the method comprising executing on the processor based on the computer readable instructions the steps of: when a plurality of the first objects having the attribute information having a predetermined relationship is arranged in series due to movement of the selected first object on the basis of the input, processing for displaying a second object different from the first objects in series at a position corresponding to an arrangement position of the first objects in series."

According to various embodiments of the present disclosure, a terminal device, a program, and a method capable of executing an application more convenient for a user can be provided.

Note that the above-described effect is simply an example provided for illustrative purposes only, and is not restrictive for convenience of description. Any effect described in the present disclosure or an apparent effect for a person skilled in the art can be exhibited in addition to or in place of the above-described effect.

DESCRIPTION OF EXEMPLARY EMBODIMENTS

Figure 1A:
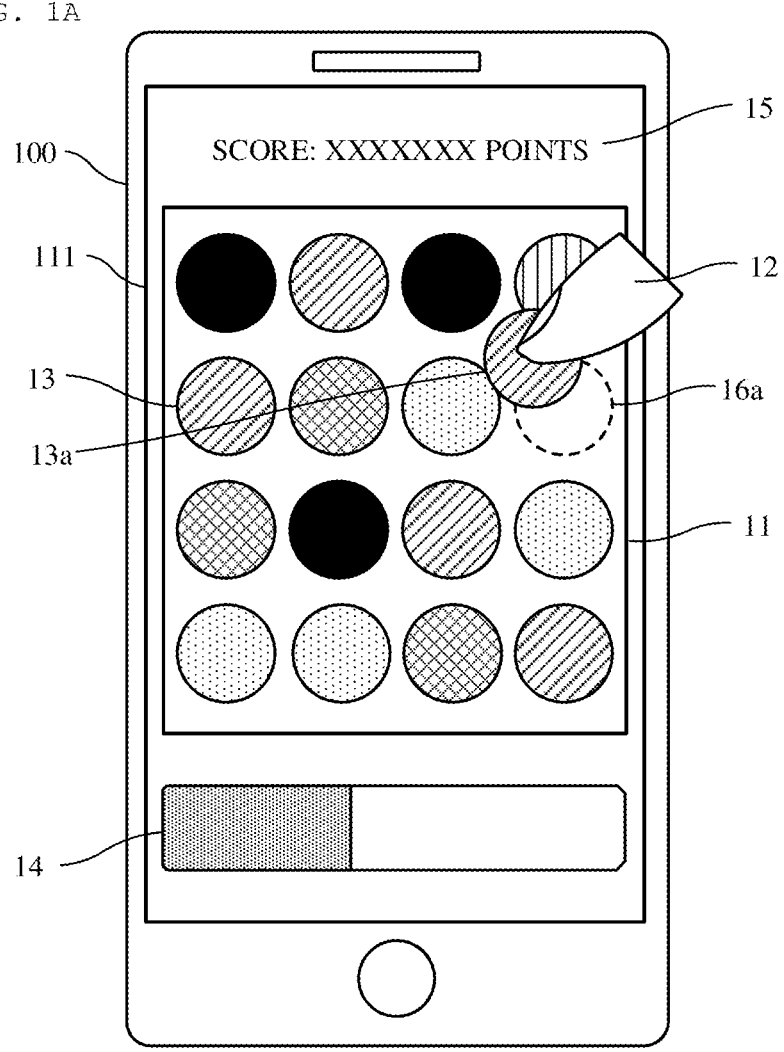
FIG. 1A is a diagram conceptually illustrating a game application executed in a system according to various embodiments of the present disclosure. Further.

Various embodiments of the present disclosure will be described with reference to the appended drawings. Note that the configuration element common in the drawings is denoted with the same reference sign.

Outline of System According to Present Disclosure

FIG. 1A is a diagram conceptually illustrating a game application executed in a system according to various embodiments of the present disclosure. To be specific, FIG. 1A illustrates an example of a screen displayed by executing, on a terminal device 100, a game application according to various embodiments of the present disclosure. According to FIG. 1A, a user selects a desired basic object 13a by tapping, from among a plurality of basic objects 13 (first objects) arranged on a board surface 11 displayed on a display 111 of the terminal device 100.

Figure 1B:
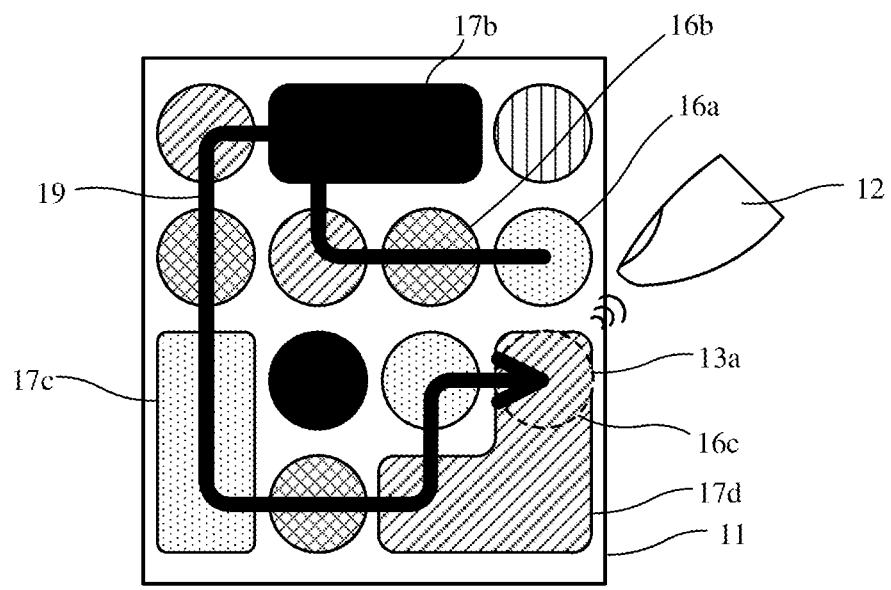
FIG. 1B is a diagram conceptually illustrating a game application executed in a system according to various embodiments of the present disclosure.

FIG. 1B conceptually illustrates the game application executed in the system according to various embodiments of the present disclosure. To be specific, FIG. 1B illustrates the board surface 11 of when the basic object 13a selected by the user, of the basic objects 13 arranged on the board surface 11, is moved from a position 16a to a position 16c along a locus 19 by an drag operation by the user. According to FIG. 1B, other basic objects are also sequentially moved and displayed on the board surface 11, following the movement of the basic object 13a along the locus 19. Further, when a plurality of basic objects having the same attribute is arranged in series as a result of the movement of other basic objects, combined objects (second objects 17b, 17c, and 17d) are sequentially displayed on positions where the basic objects are arranged in series. When the drag operation by the user is completed and the movement of the selected basic object 13a is completed, the combined objects (17b, 17c, and 17d) are deleted from the board surface 11, and an effect according to the deleted combined objects provides a predetermined effect to the user or a game character operable by the user.

That is, in the game application according to the present disclosure, when a plurality of other basic objects is arranged in series while the basic object 13a selected by the user is moved by the drag operation, a predetermined effect is provided. At this time, to display, for the user in an easy-to-understand manner, the state in which the plurality of basic objects is arranged in series and the effect is ready to be provided, the combined objects (17b, 17c, and 17d) are displayed in place of the successive basic objects.

In the examples of FIGS. 1A and 1B, the board surface 11 is formed in a rectangular shape. However, the board surface 11 may have any shape such as a circular shape. Further, the board surface 11 is displayed on the display 111 in a visually recognizable manner for the user. However, the board surface 11 is not necessarily displayed in a visually recognizable manner as long as the board surface 11 defines a movable range of the basic objects 13. Further, in the examples of FIGS. 1A and 1B, the basic object 13 is formed in a circular shape. However, the basic object 13 may have any shape such as a quadrangular shape, or a combination of a plurality of shapes. Further, in the example of FIGS. 1A and 1B, the basic objects 13 and the combined objects 17 are regularly arranged on the board surface 11. However, the basic objects 13 and the combined objects 17 may be randomly arranged. Further, in the example of FIGS. 1A and 1B, the combined object 17 is displayed in place of the plurality of basic objects 13 arranged in series. However, the combined object 17 may be superimposed and displayed on the plurality of basic objects 13. Further, in the examples of FIGS. 1A and 1B, instructions are input by tapping and dragging a touch panel, using a user's finger 12. However, the instructions may be input with a stylus detectable on the touch panel or a hard key.

First Embodiment

Figure 2:
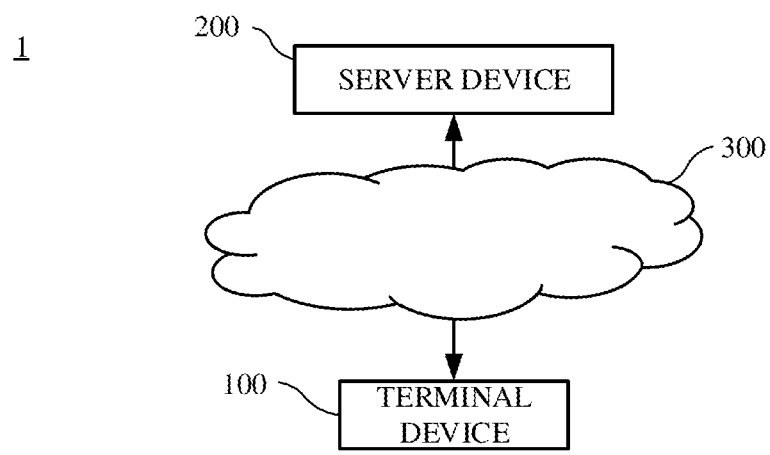
FIG. 2 is a conceptual diagram schematically illustrating a configuration of a system 1 according to a first embodiment of the present disclosure.

1. Configuration of System 1 According to First Embodiment of Present Disclosure FIG. 2 is a conceptual diagram schematically illustrating a configuration of a system 1 according to a first embodiment of the present disclosure. Referring to FIG. 2, the system 1 includes the terminal device 100 and a server device 200 communicatively connected to the terminal device 100 via a network 300. The server device 200 and the terminal devices 100 communicate with each other as needed, and transmit/receive various types of information, programs, and the like necessary for progress of the application.

In the example of FIG. 2, only one terminal device 100 is illustrated. However, a plurality of the terminal devices may be connected to the server device 200. Further, the server device 200 is illustrated as a single server device. However, function elements and processing of the server device 200 may be able to be distributed to a plurality of server devices. Further, the terminal device 100 and the server device 200 may be able to execute functions other than the function related to execution of the game application according to the present embodiment.

2. Configuration of Terminal Device 100

Figure 3:
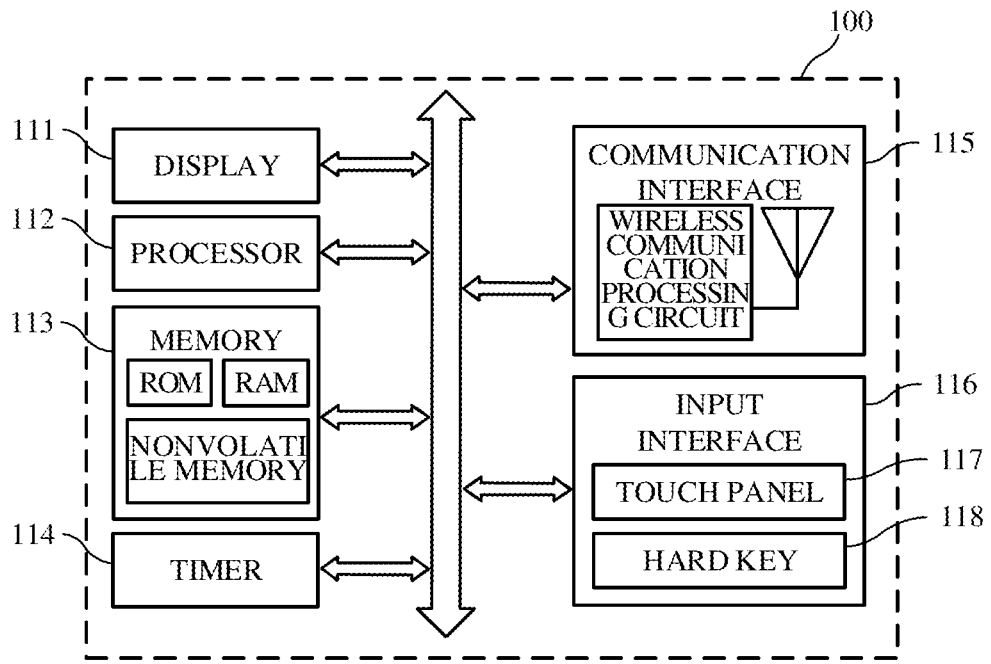
FIG. 3 is a block diagram illustrating an example of a configuration of the terminal device 100 according to the first embodiment of the present disclosure.

FIG. 3 is a block diagram illustrating an example of a configuration of the terminal device 100 according to the first embodiment of the present disclosure. The terminal device 100 does not need to include all the configuration elements illustrated in FIG. 3, and can have a configuration in which a part of the configuration elements is omitted or a configuration to which another configuration element is added.

An example of the terminal device 100 includes a mobile terminal device that can perform wireless communication, represented by a smart phone. However, any terminal device may be employed as long as the terminal device can communicate with the server device 200 and can execute the game application according to the present embodiment, such as a portable game machine, a feature phone, a portable information terminal, a PDA, a laptop personal computer, or a desktop personal computer.

According to FIG. 3, the terminal device 100 includes a display 111, a processor 112, a memory 113, a timer 114, a communication interface 115, and an input interface 116 including a touch panel 117 and a hard key 118. Then, these configuration elements are electrically connected with one another through a control line and a data line.

The display 111 functions as a display unit that reads out image information stored in the memory 113 and performs various types of display according to an instruction of the processor 112. To be specific, the display 111 virtually displays the plurality of basic objects 13, the board surface 11 on which the basic objects 13 are arranged, the combined objects 17, a time bar 14, a score 15, and the like in association with the game application according to the present embodiment. The display 111 is configured from a liquid crystal display, for example.

The processor 112 is configured from a CPU (microcomputer), and functions as a control unit that controls connected other configuration elements on the basis of various programs stored in the memory 113. The processor 112 processes instruction commands stored in the memory 113, that is, a program for executing the game application according to the present embodiment and a program for executing an OS. To be specific, the processor 112 executes various types of processing associated with the game application according to the present embodiment, including control of movement of the basic objects 13 arranged on the board surface 11 in response to an instruction input by the user via the input interface 116, and control regarding display and deletion of the combined object 17. Note that the processor 112 may be configured from a single CPU. However, the processor 112 may be configured from a plurality of CPUs. Further, the processor 112 may be configured from an appropriate combination of other types of processors such as a GPU dedicated to image processing.

The memory 113 includes a RAM, a ROM, or a nonvolatile memory (in some cases, an HDD), and functions as a storage unit. The ROM stores the application according to the present embodiment and an instruction command for execution of the OS as programs. The RAM is a memory used to write and read data while the programs stored in the ROM are processed by the processor 112. The nonvolatile memory is a memory in which write and read of data are executed by execution of the programs, and the data written here is stored after the execution of the programs is terminated. In the memory 113, as an example, attribute information is stored in association with the basic object 13 and the combined object 17. Examples of the attribute information include color attributes of objects such as "blue", "red", and "yellow", shape attributes of objects such as "circle", "triangle", "square", and "star", characteristic attributes of objects such as "fire", "water", and "forest". Although not especially illustrated, in the memory 113, user information (a user name, user identification information, a game character name operable by the user, a level of the game character, offensive power, defensive power, and the like) of the game application received from the server device 200, and result information that is a result of execution of the game application are updated as needed and stored. Further, although not especially illustrated, in the memory 113, position information of the basic object 13 and the combined object 17 arranged on the board surface 11 is updated as needed and stored.

The timer 114 functions as a timing unit. The timer 114 is used to calculate an elapsed time from when the movement of the basic objects 13 became possible. Time information used for the calculation is stored in the memory 113 as needed under control of the processor 112.

The communication interface 115 includes a wireless communication processing circuit and an antenna connected to the wireless communication processing circuit, and functions as a communication unit. The communication interface 115 transmits and receives the programs necessary for execution of the game application according to the present embodiment, the user information, the result information of execution of the game application, and the like to and from the server device 200 connected via the network 300. The wireless communication processing circuit performs processing such as modulation and demodulation of the information to be transmitted and received.

The communication interface 115 performs processing by a broadband wireless communication system represented by a wideband-code division multiple access (W-CDMA) system. However, the processing can be performed on the basis of a system related to a wireless LAN represented by IEEE802.11 or narrowband wireless communication such as Bluetooth (registered trademark).

The communication interface 115 can use wired communication in place of or in addition to the wireless communication. In this case, a communication processing circuit for wired communication may be provided in place of or in addition to the wireless communication processing circuit.

The input interface 116 includes the touch panel 117 and/or the hard key 118, and receives various instruction inputs form the user. The touch panel 117 is arranged to cover the display 111, and outputs information of position coordinates touched by an object (a user's finger, a stylus, or the like) corresponding to image data displayed on the display 111. As a touch panel system, a known system can be used, such as a resistive film system, an electrostatic capacitive coupling system, or an ultrasonic surface acoustic wave system. In the present embodiment, the input interface 116 is used to detect a selection operation (for example, a tap operation) of the basic object 13 and a moving operation (for example, a drag operation) of the basic object 13.

3. Configuration of Server Device 200

Figure 4:
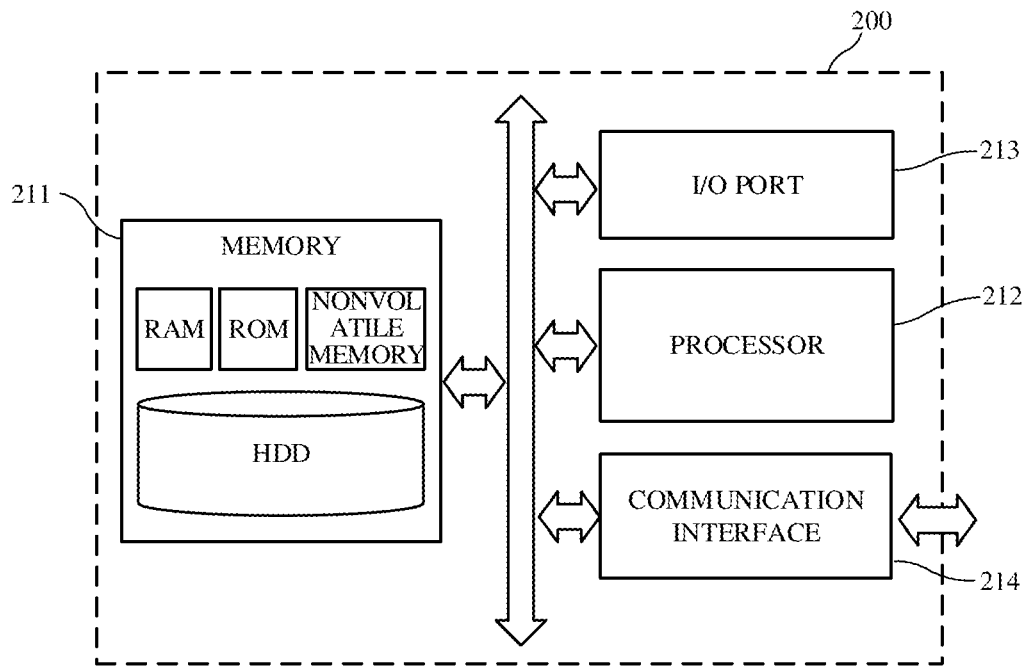
FIG. 4 is a block diagram illustrating an example of a configuration of a server device 200 according to the first embodiment of the present disclosure.

FIG. 4 is a block diagram illustrating an example of a configuration of the server device 200 according to the first embodiment of the present disclosure. The server device 200 does not need to include all the configuration elements illustrated in FIG. 4, and can have a configuration in which a part of the configuration elements is omitted or a configuration to which another configuration element is added.

According to FIG. 4, the server device 200 includes a memory 211 including a RAM, a ROM, a nonvolatile memory, and an HDD, a processor 212 configured from a CPU and the like, an I/O port 213, and a communication interface 214 including a communication processing circuit. Then, these configuration elements are electrically connected with one another through a control line and a data line.

The memory 211 includes the ROM, the RAM, the nonvolatile memory, and the HDD, and functions as a storage unit. Then, the memory 211 stores the application according to the present embodiment and the instruction commands for execution of the OS as programs. Such programs are loaded and executed by the processor 212. Further, the memory (particularly RAM) is temporarily used to execute write and read of data while the programs are processed by the processor 212. In the present embodiment, as an example, the memory 211 stores the user information (a user name, user identification information, a game character name operable by the user, a level of the game character, offensive power, defensive power, and the like) used for execution of the game application, and the result information that is a result of execution of the game application in association with each other.

The processor 212 is configured from a CPU (microcomputer), and functions as a control unit that executes the instruction commands stored in the memory 211, that is, various programs, to control the connected other configuration elements. For example, the processor 212 refers to the user information to perform authentication processing upon receiving the user identification information from the terminal device 100, and performs processing of transmitting the user information necessary for execution of the game application to the terminal device 100. Note that the processor 212 may be configured from a single CPU. However, the processor 212 may be configured from a plurality of CPUs.

The communication interface 214 performs processing such as modulation and demodulation in order to transmit and receive the programs for execution of the game application according to the present embodiment and various types of information to and from the terminal device 100 via the network 300, or to and from another server device via the network 300. The communication interface 214 communicates with the terminal devices or another server device according to a known wireless communication system or a known wired communication system. In the present embodiment, as an example, the communication interface 214 executes processing for transmitting the user information according to the processor 212.

Although not especially illustrated, the I/O port 213 functions as an information input/output unit for inputting and outputting information to and from various external devices such as a printer. As the I/O port 213, a known connection system such as a serial port, a parallel port, or a USB can be employed at the request.

4. Processing Flow of Game Application in Terminal Device 100

Figure 5:
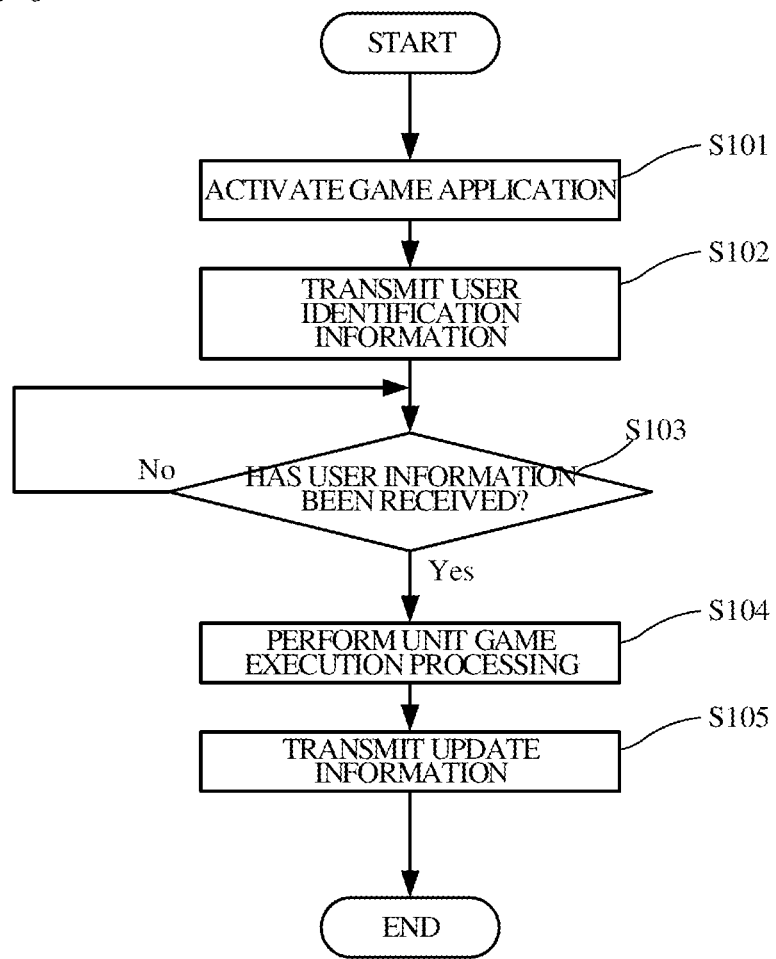
FIG. 5 is a diagram illustrating a processing flow executed in the terminal device 100 according to the first embodiment of the present disclosure.

FIG. 5 is a diagram illustrating a processing flow executed in the terminal device 100 according to the first embodiment of the present disclosure. To be specific, the processing flow illustrated in FIG. 5 is a processing flow started when the game application according to the present embodiment is activated on the terminal device 100. The processing flow is performed by the processor 112 by reading out and executing the instruction command (program) stored in the memory 113.

According to FIG. 5, when the touch operation of an activation icon of the game application according to the present embodiment displayed on the display 111 on the touch panel 117 is detected, the processor 112 performs activation processing of the game application (S101). Then, the processor 112 controls the communication interface 115 to transmit the user identification information stored in the memory 113 to the server device 200 as the user who holds the terminal device 100, that is, the user of the game application (S102).

When receiving the user identification information, the server device 200 authenticates whether the user is a legitimate user. When the user is a legitimate user, the server device 200 transmits the user information necessary for execution of the game application to the terminal device 100.

The processor 112 of the terminal device 100 waits until receiving the user information from the server device 200 (S103). If the processor 112 has received the user information, the processor 112 executes unit game execution processing included in the game application (S104). Details of the unit game execution processing will be described below.

When the touch panel 117 receives an instruction input to terminate the running game application, the processor 112 controls the communication interface 115 to transmit the user information updated and stored in the memory and the result information indicating the execution result of the game application to the server device 200 (S105). Then, the processor 112 terminates the execution of the running game application.

Note that the unit game means a unit of game, and is expressed by a quest, a scenario, a chapter, a dungeon, a mission, or the like. The game application according to the present embodiment is composed of a plurality of unit games. Then, in each of the memories of the terminal device 100 and/or the server device 200, a program for executing the unit game and various kinds of information (clear information of the unit game, enemy character information, consumption stamina, etc.) are stored in association with the user identification information. Then, by reading and executing the program and the various kinds of information, the unit game is executed.

5. Processing Flow of Unit Game in Terminal Device 100

Figure 6:
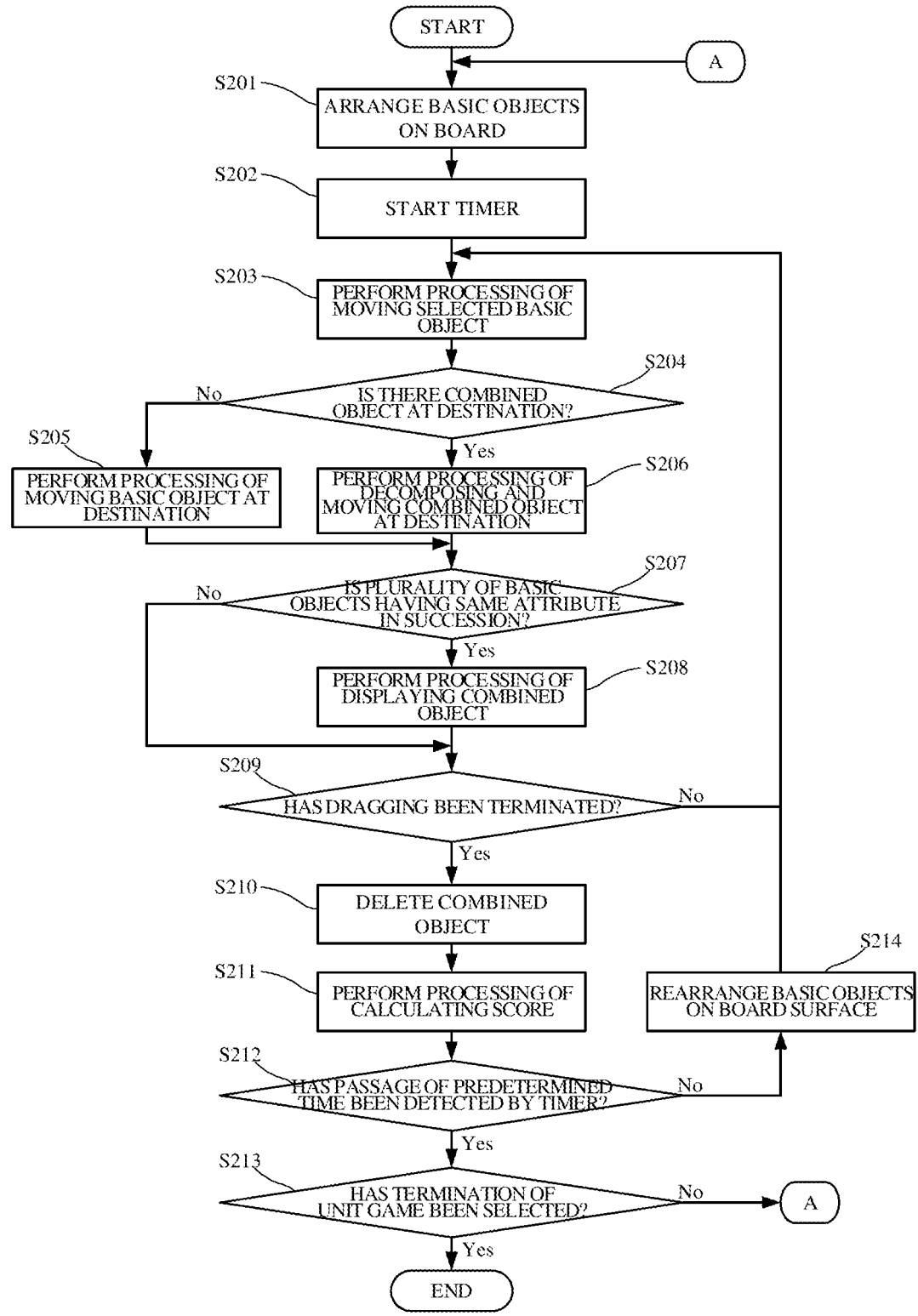
FIG. 6 is a diagram illustrating a processing flow executed in the terminal device 100 according to the first embodiment of the present disclosure.

FIG. 6 is a diagram illustrating a processing flow executed in the terminal device 100 according to the first embodiment of the present disclosure. To be specific, the processing flow illustrated in FIG. 6 is a processing flow started when execution of a desired unit game is instructed by the user while the game application according to the present embodiment is being executed. The processing flow is performed by the processor 112 by reading out and executing the instruction command (program) stored in the memory 113.

According to FIG. 6, when execution of the unit game is instructed by the user, the processor 112 controls the display to arrange and display the plurality of basic objects 13 on the board surface 11 that configures the unit game (S201). When the selection operation of the basic object 13 by the user and the moving operation of the basic object 13a become available, clocking is started using the timer 114 (S202).

Next, the instruction input (tap operation) to select one basic object 13a out of the plurality of basic objects 13 and the instruction input (drag operation) to move while tapping the selected basic object 13a to an arbitrary position on the board surface 11 by the user are accepted on the touch panel 117, the processor 112 executes processing of moving the selected basic object 13a (S203). Next, the processor 112 determines whether the combined object 17 is arranged at a destination position (S204). As a result of the determination, when the combined object 17 is not arranged, processing of moving another basic object originally arranged at the destination position is performed (S205). Note that processing performed when the combined object 17 is arranged in S204 will be described later.

Figure 7:
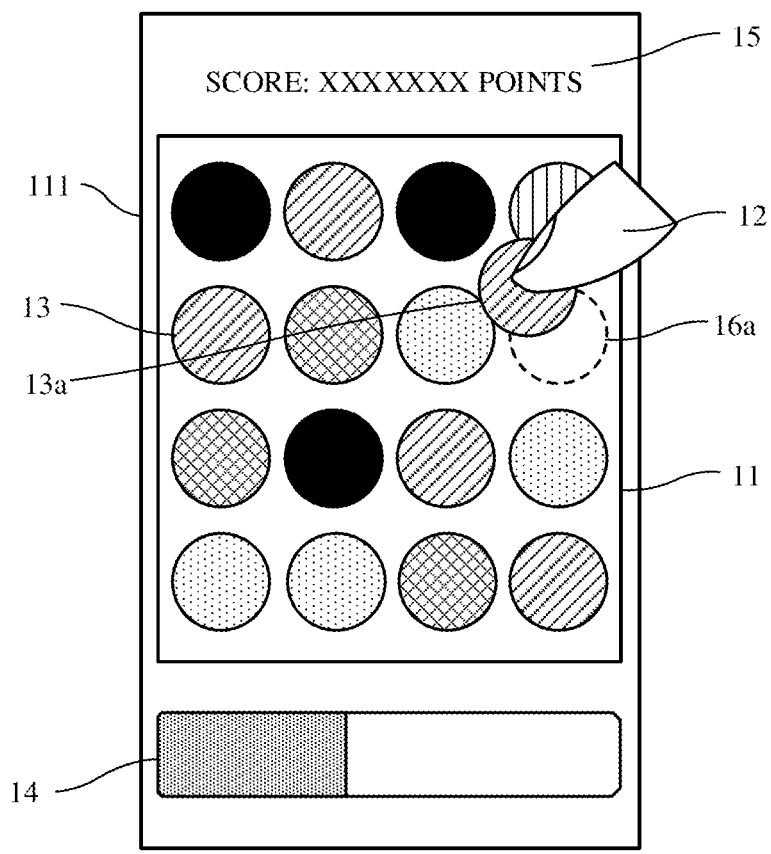
FIG. 7 is a diagram illustrating an example of a screen displayed on a display 111 of the terminal device 100 according to the first embodiment of the present disclosure.

FIG. 7 is a diagram illustrating an example of a screen displayed on the display 111 of the terminal device 100 according to the first embodiment of the present disclosure. To be specific, FIG. 7 illustrates an example of a screen of when one basic object 13a is selected from among the plurality of basic objects 13 arranged on the board surface 11 by the processing according to S203 of FIG. 6 and movement is started. According to FIG. 7, on the display 111, the currently acquired score 15 and the time bar 14 indicating the remaining time in which the running unit game is executable are displayed on the display 111, in addition to the board surface 11 and the basic objects 13.

Then, when the position on the touch panel corresponding to the display position of the basic object 13a is tapped by the finger 12 of the user, the basic object 13a is selected. Then, when the finger 12 is dragged in an arbitrary direction without canceling the tap by the finger 12, the selected basic object 13a starts movement from the position 16a where the basic object 13a was originally arranged, following the finger 12. When the selected basic object 13a is superimposed on a display position of another basic object, the another basic object is moved to be shifted to the position 16a where the basic object 13a was originally arranged.

Figure 8A:
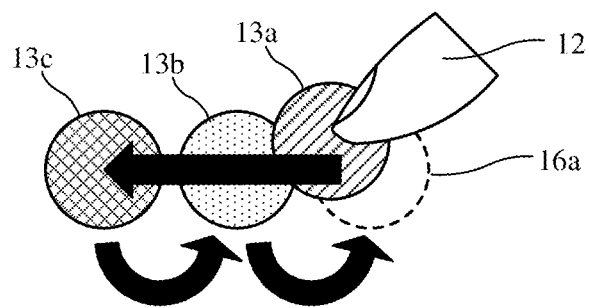
FIG. 8A is a diagram conceptually illustrating movement of basic objects 13 in the application according to the first embodiment of the present disclosure. Further.

FIG. 8A is a diagram conceptually illustrating movement of the basic objects 13 in the application according to the first embodiment of the present disclosure. To be specific, FIG. 8A is an enlarged view of a part of the board surface 11. FIG. 8A illustrates a state in which other basic objects 13b and 13c are slid to and arranged at new positions, following the movement of the selected basic object 13a in the left direction by the processing according to S203 to S205 of FIG. 6. According to FIG. 8A, when the basic object 13a is selected and dragged by the finger 12 in the left direction, the movement is started from the originally arranged position 16a. Then, when the selected basic object 13a is superimposed and displayed on a display area of the basic object 13b, the superimposed basic object 13b is slid to the position 16a where the basic object 13a was originally arranged. Further, when the selected basic object 13a is moved in the left direction and is superimposed and displayed on a display area of the basic object 13c, the superimposed basic object 13c is slid to the position where the basic object 13b was originally arranged.

In FIG. 8A, the case in which the selected basic object 13a is moved in the left direction has been described. However, the same applies to the case where the basic object 13a is moved in the right direction.

Figure 8B:
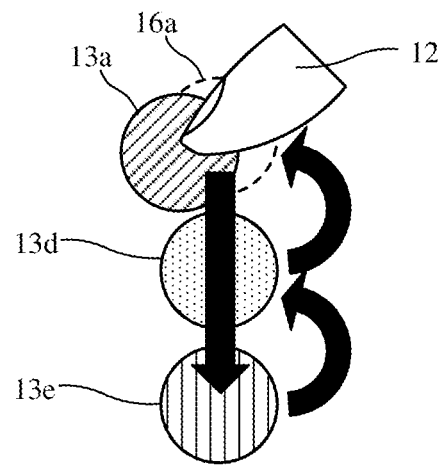
FIG. 8B is a diagram conceptually illustrating movement of basic objects 13 in the application according to the first embodiment of the present disclosure.

FIG. 8B is a diagram conceptually illustrating movement of the basic objects 13 in the application according to the first embodiment of the present disclosure. To be specific, FIG. 8B is an enlarged view of a part of the board surface 11. FIG. 8B illustrates a state in which other basic objects 13d and 13e are slid to and arranged at new positions, following the movement of the selected basic object 13a in a down direction by the processing according to S203 to S205 of FIG. 6. According to FIG. 8B, when the basic object 13a is selected and dragged in the down direction by the finger 12, the movement starts from the originally arranged position 16a. Then, when the selected basic object 13a is superimposed and displayed on a display area of the basic object 13d, the superimposed basic object 13d is slid to the position 16a where the basic object 13a was originally arranged. Further, when the selected basic object 13a is moved in the down direction and is superimposed and displayed on a display area of the basic object 13e, the superimposed basic object 13e is slid to the position where the basic object 13d was originally arranged.

In FIG. 8B, the case in which the selected basic object 13a is moved in the down direction has been described. However, the same applies to the case where the basic object 13a is moved in an up direction.

In FIGS. 8A and 8B, the cases where the basic object 13a is moved in the up and down, and right and left directions have been described. However, similar processing can be performed in cases where the basic object 13a is moved in arbitrary directions such as an oblique direction.

Referring back to FIG. 6, the processor 112 determines whether a plurality of the basic objects having the same attribute information is arranged in series (S207) as a result of the processing of moving the basic object 13a and the processing of moving another basic object illustrated in FIGS. 7, 8a and 8b. When the plurality of basic objects is not arranged in series, the basic objects are moved and arranged as they are, and the processing is moved onto S209. On the other hand, when the plurality of basic objects is arranged in series, the processor 112 performs processing of displaying a combined object at the arrangement positions of the basic objects arranged in series (S208).

In S207, the processor 112 determines whether the basic objects have the same attribute information. However, the present embodiment is not limited thereto, and whether the attribute information associated with the plurality of basic objects arranged in series satisfies a predetermined relationship may just be determined. For example, in a case of determining in advance that the predetermined relationship is established in combinations of the "blue" attribute and the "red" attribute, the "yellow" attribute and the "green" attribute, and the "black" attribute and the "white" attribute, determination may be made according to the predetermined relationship.

Figure 9A:
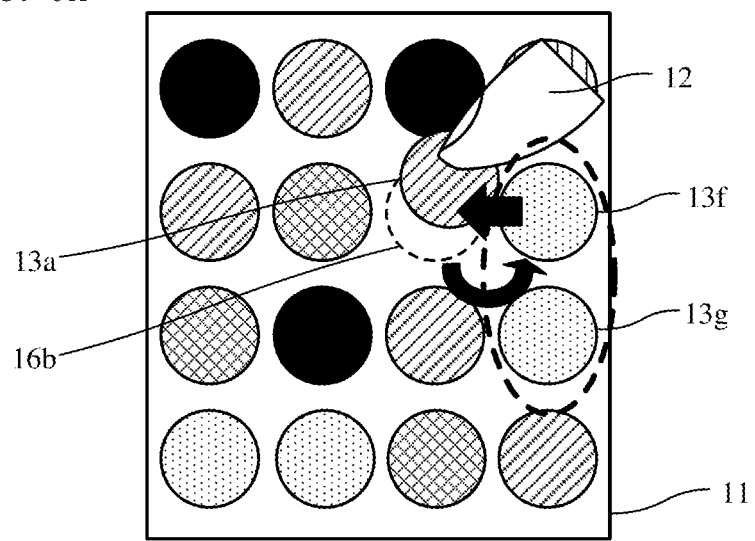
FIG. 9A is a diagram conceptually illustrating arrangement of objects in the application according to the first embodiment of the present disclosure. Further.
Figure 9B:
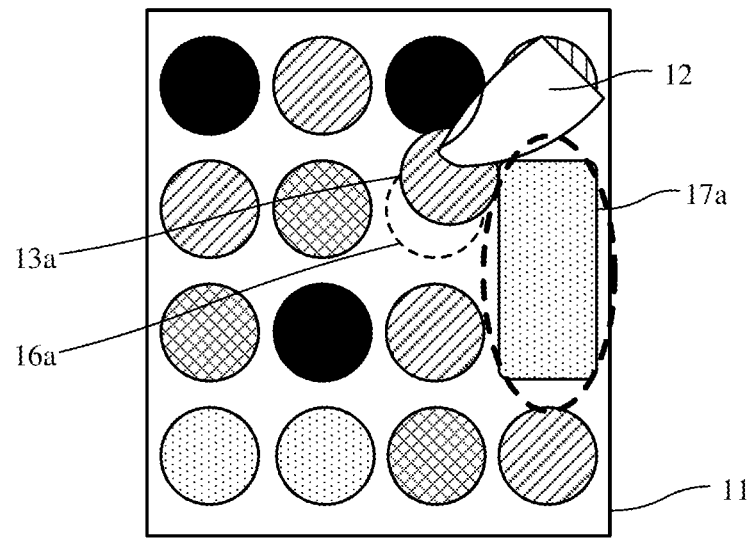
FIG. 9B is a diagram conceptually illustrating arrangement of objects in the application according to the first embodiment of the present disclosure.

FIGS. 9A and 9B are diagrams conceptually illustrating arrangement of objects in the application according to the first embodiment of the present disclosure. To be specific, FIGS. 9A and 9B illustrate a state where the combined object 17 is displayed when processing of displaying a combined object is performed by the processing according to S205 to S208 of FIG. 6.

According to FIG. 9A, when the basic object 13a selected by the finger 12 is moved in the left direction, a basic object 13f arranged at a position 16b is slid in the right direction. Then, both the basic object 13f and a basic object 13g have the same attribute information (for example, the "red" attribute), and thus the plurality of basic objects having the same attribute information become arranged in series.

In this case, in the present embodiment, a combined object 17a having a different shape from the basic objects 13f and 13g arranged in series is displayed on the board surface 11, as illustrated in FIG. 9B. This combined object 17a is displayed at the display positions of the basic objects 13f and 13g arranged in series. In the present embodiment, in particular, the combined object 17a is displayed, replacing the basic objects 13f and 13g.

Note that the display form of the combined object 17a is not limited to the example illustrated in FIG. 9B, the combined object 17a may be superimposed on the basic objects in a manner that the basic objects 13f and 13g in series can be visually recognized. Further, the display position of the combined object 17a may just correspond to the display positions of the basic objects 13*f* and 13*g*. That is, the combined object 17*a* is not necessarily displayed to cover the entire basic objects, and may be displayed in only a part of the region.

Referring back to FIG. 6, when the processing of displaying the combined object illustrated in FIGS. 9A and 9B has been performed, the processor 112 determines whether the drag operation by the user has been terminated, that is, whether the finger 12 is released from the position on the touch panel corresponding to the display position of the selected basic object 13*a* (S209). When it is determined that the drag operation has not been terminated, the movement of the selected basic object 13*a* is still continued, and thus the processing of S203 to S209 is repeated again.

Here, processing in the case where the combined object 17 is arranged at the destination position of the selected basic object 13*a* will be described in S204. In this case, the processor 112 decomposes the combined object at the destination into individual basic objects and processes the individual basic objects to be moved to respective predetermined positions (S206).

Figure 10A:
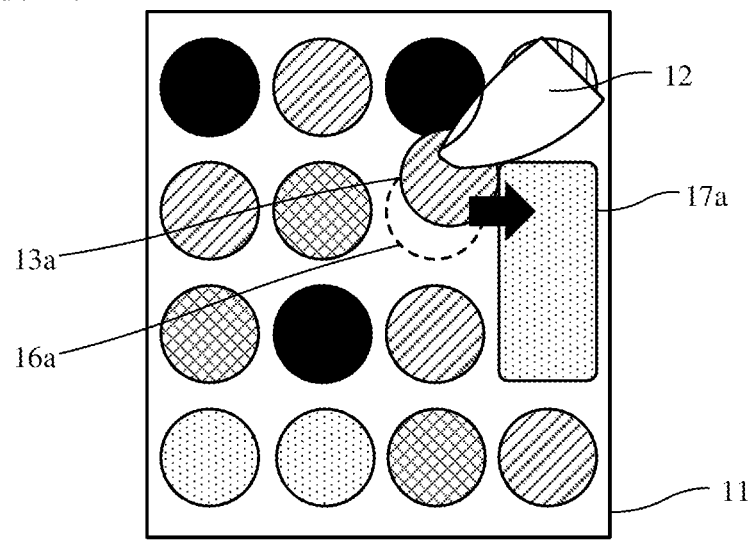
FIG. 10A is a diagram conceptually illustrating arrangement of objects in the application according to the first embodiment of the present disclosure. Further.
Figure 10B:
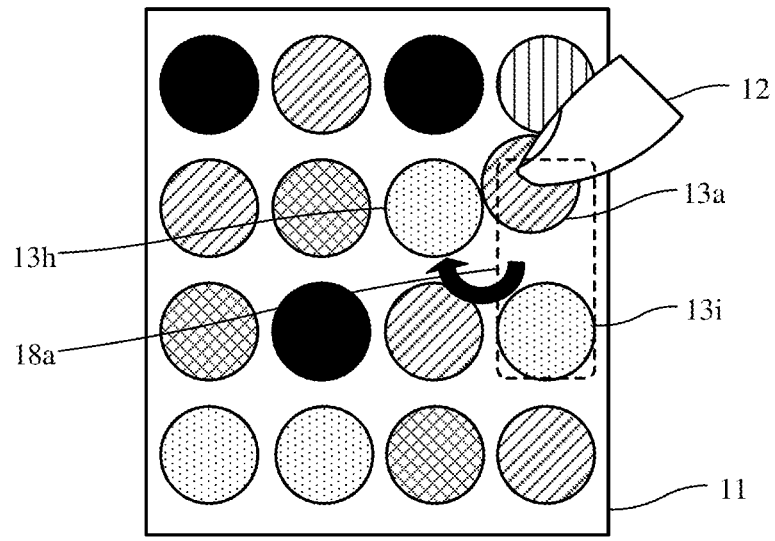
FIG. 10B is a diagram conceptually illustrating arrangement of objects in the application according to the first embodiment of the present disclosure.

FIGS. 10A and 10B are diagrams conceptually illustrating arrangement of objects in the application according to the first embodiment of the present disclosure. To be specific, FIG. 10A and FIG. 10B illustrate a state in which the combined object 17 is decomposed and individual basic objects are respectively moved to predetermined positions by the processing according to S206 of FIG. 6.

According to FIG. 10A, when the selected basic object 13*a* is moved from the position 16*a* in the right direction, the combined object 17*a* is already displayed at the destination. According to FIG. 10B, when the selected basic object 13*a* is moved to the display area of the combined object 17*a*, the displayed combined object 17*a* is decomposed into basic objects 13*h* and 13*i*. At this time, as for the basic object 13*h*, the selected basic object 13*a* has already been moved to the display area of the basic object 13*h*, and thus the basic object 13*h* is slid to and arranged at the position 16*a* where the selected basic object 13*a* was originally displayed. Meanwhile, the moved basic object 13*a* and the basic object 13*i* are displayed at the position corresponding to the display position of the combined object 17*a*. That is, as illustrated in FIGS. 10A and 10B, by changing the display mode of the combined object, the user can easily determine whether a plurality of basic objects having the same attribute is arranged in series.

Referring back to FIG. 6, when the processing according to S203 to S209 is repeatedly performed and termination of the drag operation is determined in S209, the processor 112 terminates the movement of the selected basic object 13*a*, and performs processing of deleting the displayed combined object 17 from the board surface 11 (S210). Then, the processor 112 performs processing of calculating the score to be given to the user according to the deleted combined object 17, and updating the score information of the user stored in the memory 113 on the basis of the calculated score (S211). Note that, in S210, the termination of the movement of the basic object 13*a* has been determined according to the termination of the drag operation, that is, whether the finger 12 has been released. However, the termination condition can be replaced with a condition such as whether the operated finger has gone outside the board surface 11, whether the finger has come in contact with an operation obstacle object arranged on the board surface 11, or whether the time has reached an operation limit time during the operation, or the conditions can be appropriately combined.

Next, the processor 112 determines whether a predetermined time has passed after the start of the clocking by the timer 114 in S202 (S212). Then, when the predetermined time has not passed, selection and movement of the basic objects 13 on the board surface 11 is available again, and thus processing of rearranging the basic objects 13 is performed on the board surface 11 (S214).

Figure 11A:
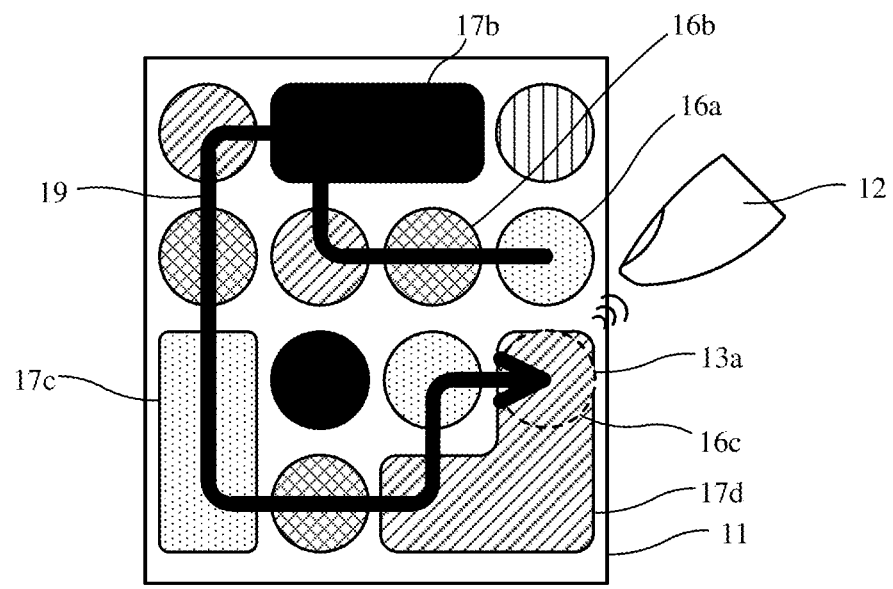
FIG. 11A is a diagram conceptually illustrating arrangement of objects in the application according to the first embodiment of the present disclosure. Further.
Figure 11B:
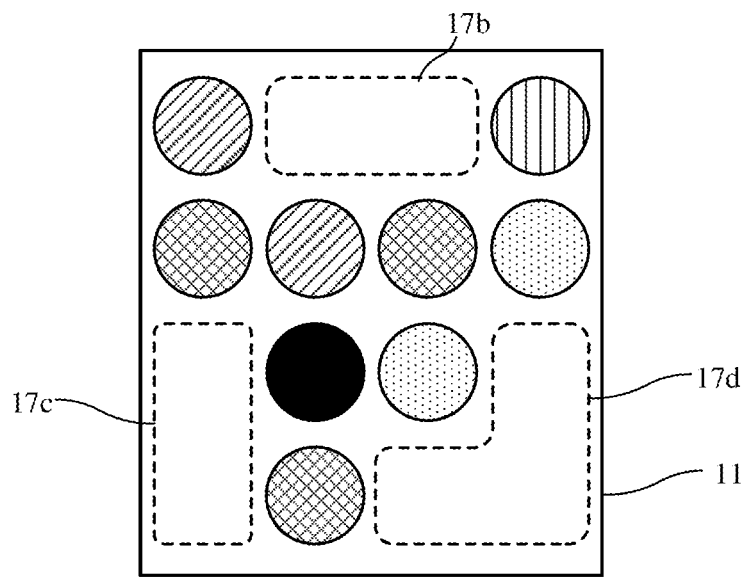
FIG. 11B is a diagram conceptually illustrating arrangement of objects in the application according to the first embodiment of the present disclosure. Further.
Figure 11C:
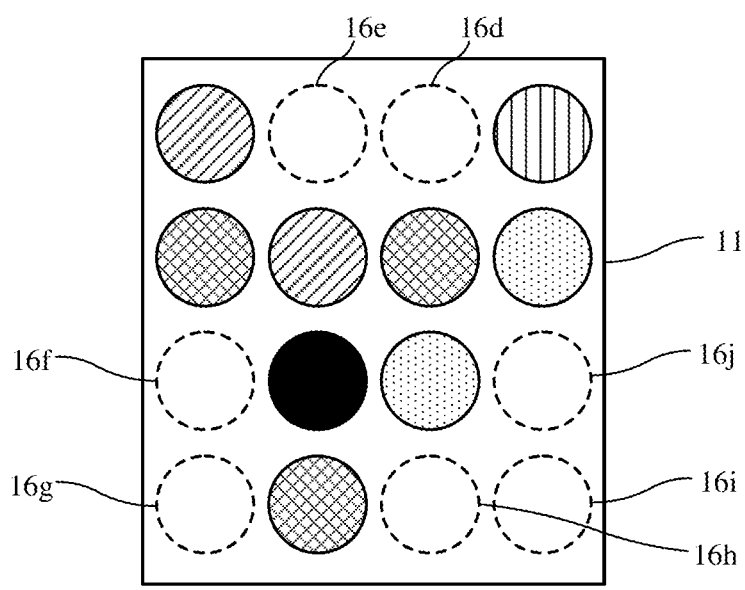
FIG. 11C is a diagram conceptually illustrating arrangement of objects in the application according to the first embodiment of the present disclosure.

FIGS. 11A to 11C are diagrams conceptually illustrating arrangement of objects in the application according to the first embodiment of the present disclosure. To be specific, FIGS. 11A to 11C illustrate a state in which the combined object 17 is deleted from the board surface 11 due to detection of the termination of the drag operation, and rearrangement of the basic objects 13 is performed, by the processing according to S209 to S214 of FIG. 6.

According to FIG. 11A, after the basic object 13*a* selected by the finger 12 is moved from the position 16*a* to the position 16*c* along the locus 19, the finger 12 is released from the basic object 13*a* and the drag operation is terminated. During the operation, other basic objects are sequentially moved following the movement of the basic object 13*a*, and the combined objects 17*b*, 17*c*, and 17*d* are displayed (that is, S203 to S209 of FIG. 6 is repeatedly executed while the basic object 13*a* is moved).

Then, as illustrated in FIG. 11B, when the drag operation is detected on the touch panel 117, the displayed combined objects 17*b*, 17*c*, and 17*d* are deleted from the board surface 11. At this time, the score is given to the user according to the deleted combined object 17, as described in S211 of FIG. 6. Note that a larger score may be given according to the number of the deleted combined objects 17. Further, a larger score may be given as the area of the deleted combined object 17 is larger. Further, the given score may be differentiated according to the attribute of the deleted combined object 17.

Then, as illustrated in FIG. 11C, arbitrary basic objects 13 are rearranged by the processor 112 at the positions 16*d* to 16*j* after the combined objects 17 are deleted. Note that the basic objects 13 displayed in advance are sequentially slid and displayed at the deleted positions 16*d* to 16*j*, and after that, arbitrary basic objects may be rearranged at positions where none of the basic objects 13 is arranged.

Referring back to FIG. 6, when passage of the predetermined time is detected in S212, that is, when an area indicating a remaining time, of the time bar 14 illustrated in FIG. 7, becomes zero, the processor 112 determines whether termination of the running unit game has been selected by the user. When termination has not been selected, the processor 112 starts the processing again from S201. On the other hand, when the termination has been selected, the processor 112 terminates the unit game execution processing, and the processing is moved onto S105 in FIG. 5.

The display of the combined objects 17 has been described in steps S203 to S209 of FIG. 6, FIGS. 9A and 9B, and FIGS. 11A to 11C. However, the basic object 13 having the same attribute information as the already displayed combined object may be arranged in series in the process of the movement, depending on the locus of the movement of the selected basic object 13*a*.

Figure 12:
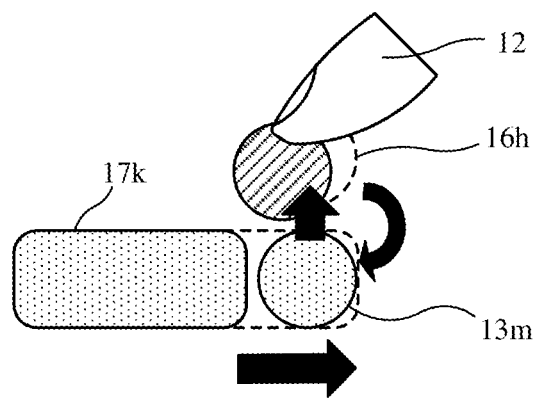
FIG. 12 is a diagram conceptually illustrating a display of a combined object 17 in the application according to the first embodiment of the present disclosure.

FIG. 12 is a diagram conceptually illustrating a display of a combined object 17 in the application according to the first embodiment of the present disclosure. To be specific, FIG. 12 illustrates a state in which the display area of an already displayed combined object 17*k* is enlarged in the right direction and displayed in the process of the movement of the selected basic object 13*a*. According to FIG. 12, the basic object 13*a* is superimposed and displayed on the position 16h where a basic object 13m was originally displayed due to upward movement in the process of the movement of the basic object 13a. As a result, the basic object 13m is slid in the down direction. As a result, the basic object 13m having the same attribute information as the already displayed combined object 17k are arranged in series. In such a case, the combined object 17k is enlarged and displayed to a position corresponding to the arrangement position of the basic object 13m.

As described above, in the present embodiment, as is apparent from FIG. 6, the movement of the basic objects 13 and the display of the combined object 17 are made while the drag operation is continued, and the combined object 17 is deleted from the board surface 11 when the drag operation is terminated. Then, a predetermined effect is given to the user or the game character operable by the user according to the deleted combined object. At this time, since the object to be deleted is displayed in a different shape from the normal basic objects 13, the user can easily distinguish the object to be deleted. Further, with such display, drawing of a plurality of objects displayed on the board surface 11 is integrated. Therefore, such display contributes to reduction of the load on the memory and improvement of the processing speed.

Second Embodiment

In the first embodiment, the case of providing the "score" according to the deleted combined object 17 as an effect to be provided to the user or the game character operable by the user has been described. In a second embodiment, damage to an enemy character in a competing game is provided as an effect to be provided to a user or a game character operable by the user. Note that the present embodiment has similar configurations, processing, and procedures to the first embodiment except the points specifically described below. Therefore, detailed description of the similar matters is omitted.

Figure 13:
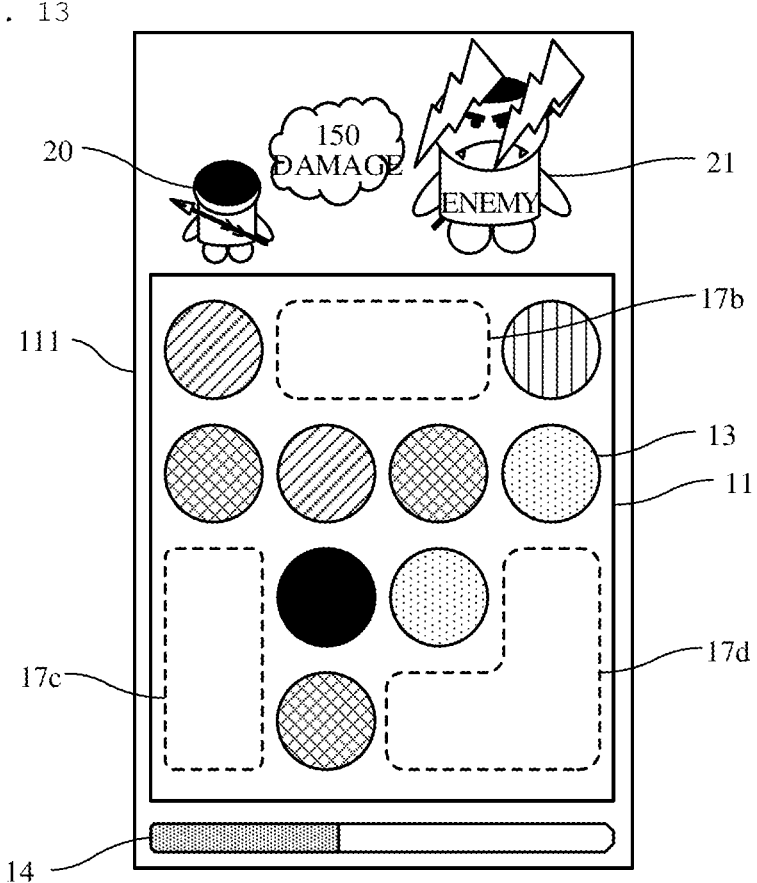
FIG. 13 is a diagram illustrating an example of a screen displayed on a display 111 of a terminal device 100 according to a second embodiment of the present disclosure.

FIG. 13 is a diagram illustrating an example of a screen displayed on a display 111 of a terminal device 100 according to the second embodiment of the present disclosure. To be specific, FIG. 13 illustrates a state in which combined objects are deleted from a board surface 11, and a game character 20 operable by a user damages an enemy character 21 with offensive power according to the deleted combined objects.

Here, parameter values of offensive power and defensive power are stored in association with each game character and enemy character in advance. When combined objects 17b, 17c, and 17d are deleted, damage to be provided to the enemy character 21 is calculated on the basis of attribute information of the deleted combined objects, the offensive power of the game character 20, and the defensive power of the enemy character 21. In the example illustrated in FIG. 13, an effect to provide 150 damage to the enemy character 21 is provided. With the effect, 150 damage can be subtracted from a hit point parameter of the enemy character 21.

Note that, in the present embodiment, the damage to the enemy character has been described as an example of the effect. However, improvement of temporary offensive power and defensive power can be the effect, for example.

Third Embodiment

In the first and second embodiments, the cases of arranging the basic objects 13 in a 4×4 lattice manner on the board surface 11 have been described. In a third embodiment, basic objects 13 are arranged at arbitrary positions on a board surface 11, instead of in the lattice manner. Note that the present embodiment has similar configurations, processing, and procedures to the first and second embodiments except the points specifically described below. Therefore, detailed description of the similar matters is omitted.

Figure 14:
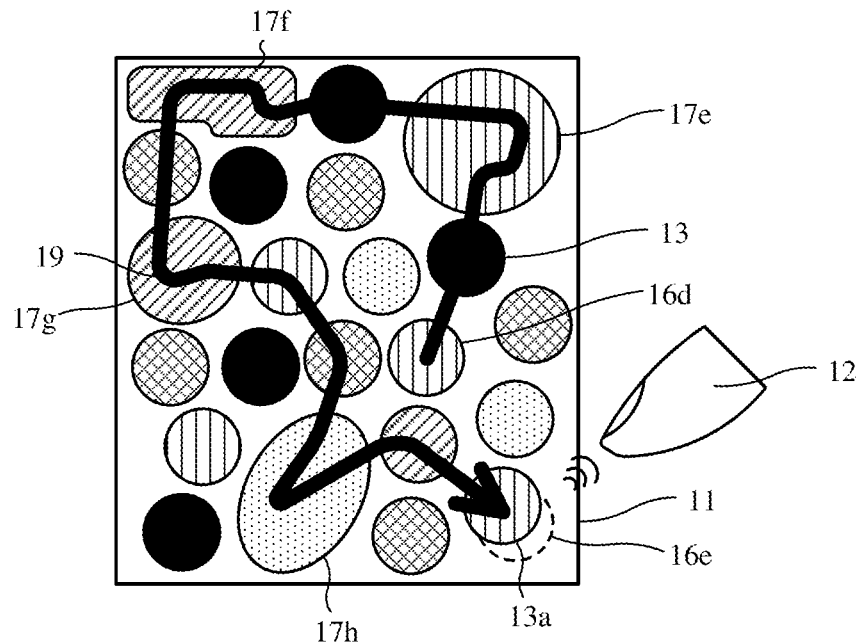
FIG. 14 is a diagram conceptually illustrating arrangement of objects in an application according to a third embodiment of the present disclosure.

FIG. 14 is a diagram conceptually illustrating arrangement of objects in an application according to the third embodiment of the present disclosure. To be specific, FIG. 14 illustrates a state in which a selected basic object 13a is moved on the board surface 11 on which the basic objects 13 are arranged at arbitrary positions. According to FIG. 14, the selected basic object 13a is moved by a drag operation of a finger 12 from a position 16d to a position 16e along a locus 19. Other basic objects are sequentially moved following the movement of the selected basic object 13a. Then, when a plurality of the basic objects 13 having the same attribute is arranged in series (or arranged adjacent to each other) due to the movement, combined objects 17e to 17h are displayed at display positions of the adjacent basic objects 13. At this time, shapes and sizes of the combined objects 17e to 17h can be determined according to the number and a positional relationship of the basic objects arranged in series.

Fourth Embodiment

In the first to third embodiments, the combined objects 17 have been displayed when two or more basic objects having the same attribute are arranged in series. In a fourth embodiment, combined object is displayed only when three or more basic objects are arranged in series. Note that the present embodiment has similar configurations, processing, and procedures to the first embodiment except the points specifically described below. Therefore, detailed description of the similar matters is omitted.

Figure 15:
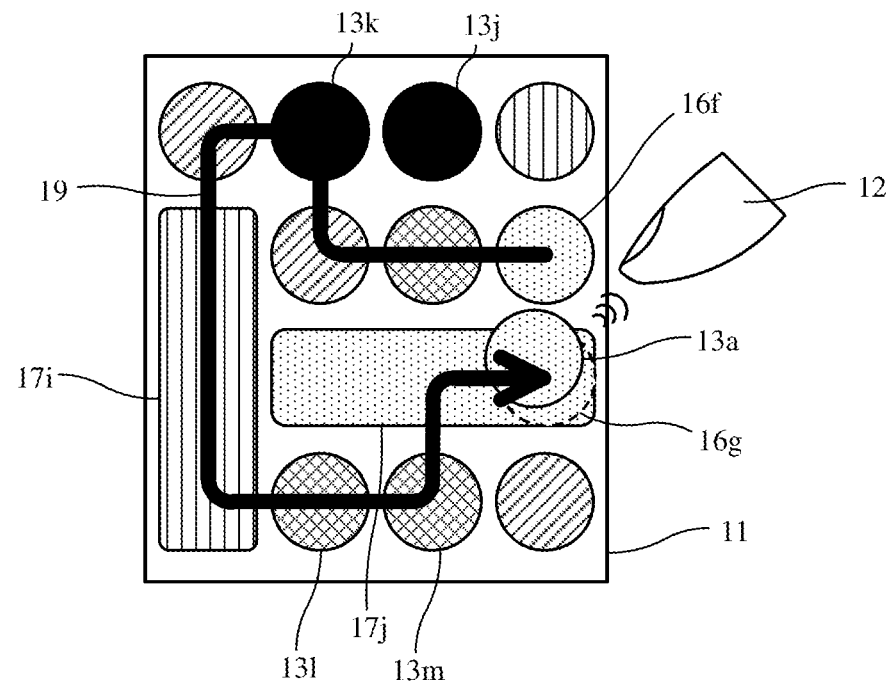
FIG. 15 is a diagram conceptually illustrating arrangement of objects in an application according to a fourth embodiment of the present disclosure.

FIG. 15 is a diagram conceptually illustrating arrangement of objects in an application according to the fourth embodiment of the present disclosure. To be specific, FIG. 15 illustrates a state in which a selected basic object 13a selected by a finger 12 is moved on a board surface 11 on which a plurality of basic objects 13 is displayed. According to FIG. 15, the selected basic object 13a is moved by a drag operation of a finger 12 from a position 16f to a position 16g along a locus 19. Other basic objects are sequentially moved following the movement of the selected basic object 13a. Then, when three or more basic objects 13 having the same attribute are arranged in series due to the movement, combined objects 17i to 17j are displayed at display positions of the basic objects 13. At this time, focusing on the basic objects 13j and 13k, and the basic objects 13l and 13m, for example, two basic objects having the same attribute are arranged in series, but three or more basic objects are not arranged in series. Therefore, the combined objects 17 are not displayed at their display positions.

The elements described in the embodiments can be appropriately combined or replaced to configure a system.

Further, the second to fourth embodiments can exhibit similar effects to those of the first embodiment.

The processing and procedures described in the present specification are not limited to the explicitly described embodiments, and can be realized by software, hardware, or a combination of the software and the hardware. To be specific, the processing and procedures described in the present specification are realized by mounting a logic corresponding to the processing to a medium such as an integrated circuit, a volatile memory, a nonvolatile memory, a magnetic disk, or an optical storage. Further, the processing and procedures described in the present specification can be mounted as a computer program and executed by various types of computers including a terminal device and a server device.

Even if description has been given such that the processing and procedures described in the present specification are executed by a single device, software, component, or module, the processing and procedures can be executed by a plurality of devices, pieces of software, components, or modules. Further, even if description has been given such that the various types of information described in the present specification are stored in a single memory or storage unit, such information can be distributed and stored in a plurality of memories included in a single device or a plurality of memories distributed and arranged in a plurality of devices. Further, the elements of software and hardware described in the present specification can be realized by being integrated into a smaller number of configuration elements or by being decomposed into a larger number of configuration elements.

The terminal device, program, and method being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:
1. A terminal device comprising:
  a display configured to display:
    a plurality of first objects,
    a second object that is different from the plurality of first objects, and
    a board on which the plurality of first objects are arranged;
  a memory configured to store computer-readable instructions and object attribute information corresponding to the plurality of first objects and the second object;
  an input interface configured to accept an input by a user for selecting and moving one of the plurality of first objects to an arbitrary position on the board; and
  a processor configured to execute the computer-readable instructions so as to:
  select one of the plurality of first objects based on the input by the user in the input interface;
  move the selected first object to the arbitrary position based on the input by the user in the input interface; and
  display the second object on the display at an arrangement position including the arbitrary position of an adjacent series of ones of the plurality of the first objects when the object attribute information of the adjacent series of ones of the plurality of first objects have first predetermined relationship,
  wherein the processor is configured to select one of the plurality of first objects, move the selected first object within a predetermined period of time, and prohibit the input interface from accepting the input by the user for selecting and moving after the predetermined period of time passes, the processor is configured to cause the display to display the second object during the movement of the selected first object, and
  when the second object is displayed adjacent to another one of the plurality of first objects on the display and when the object attribute information of the another one of the plurality of first objects has a second predetermined relationship with the object attribute information of the second object, the processor is configured to enlarge a size of the second object so as to display the second object at a position corresponding to the another one of the plurality of first objects.

2. The terminal device according to claim 1,
  wherein the first predetermined relationship is a relationship in which the adjacent series of ones of the plurality of first objects have the same object attribute information.

3. The terminal device according to claim 1,
  wherein the processor is configured to display the second object on the display at the arrangement position including the arbitrary position of the adjacent series of ones of the plurality of first objects by deleting the adjacent series of ones of the plurality of first objects from the display.

4. The terminal device according to claim 1,
  wherein the processor is configured to move another one of the plurality of first objects to a display position of the second object, and to display any of the plurality of first objects at the display position of the second object, and
  the object attribute information of the another one of the plurality of first objects and the object attribute information of the adjacent series of ones of the plurality of first objects are different from each other.

5. The terminal device according to claim 1,
  wherein the second object is displayed when a number of the adjacent series of ones of the plurality of first objects is at least three.

6. The terminal device according to claim 1,
  wherein the input interface is a touch panel,
  the selection of the one of the plurality of first objects is performed by tapping a position on the touch panel, and the position corresponds to a display position of the one of the plurality of first objects, and
  the movement of the one of the plurality of first objects is performed by dragging on the touch panel.

7. The terminal device according to claim 6,
  wherein the movement of the one of the plurality of first objects is terminated when the processor detects termination of the dragging on the touch panel.

8. A computer program product embodying computer-readable instructions stored on a non-transitory computer-readable storage medium for causing a computer to execute a process by a processor, the computer comprising:
  a display configured to display:
    a plurality of first objects,
    a second object that is different from the plurality of first objects, and
    a board on which the plurality of first objects are arranged;
  a memory configured to store object attribute information corresponding to the plurality of first objects and the second object; and
  an input interface configured to accept an input by a user for selecting and moving one of the plurality of first objects to an arbitrary position on the board,
  the computer configured to perform the steps of:
    selecting one of the plurality of first objects based on the input by the user in the input interface;
    moving the selected first object to the arbitrary position based on the input by the user in the input interface; and
    displaying the second object on the display at an arrangement position including the arbitrary position of an adjacent series of ones of the plurality of the first objects when the object attribute information of the adjacent series of ones of the plurality of first objects have a first predetermined relationship, wherein the processor is configured to select one of the plurality of first objects and move the selected first object within a predetermined period of time and prohibit the input interface from accepting the input by the user for selecting and moving after the predetermined period of time passes, the processor is configured to cause the display to display the second object during the movement of the selected first object, and when the second object is displayed adjacent to another one of the plurality of first objects on the display and when the object attribute information of the another one of the plurality of first objects has a second predetermined relationship with the object attribute information of the second object, the computer is configured to enlarge a size of the second object so as to display the second object at a position corresponding to the another one of the plurality of first objects.

9. The computer program product according to claim 8, wherein the first predetermined relationship is a relationship in which the adjacent series of ones of the plurality of first objects have the same object attribute information.

10. The computer program product according to claim 8, wherein the processor is configured to move another one of the plurality of first objects to a display position of the second object, and display any of the plurality of first objects at the display position of the second object, and the object attribute information of the another one of the plurality of first objects and the object attribute information of the adjacent series of ones of the plurality of first objects are different from each other.

11. A method for causing a processor in a computer to execute a process, the computer including:

a display configured to display:
  a plurality of first objects,
  a second object that is different from the plurality of first objects, and
  a board on which the plurality of first objects are arranged;
a memory configured to store computer-readable instructions and object attribute information corresponding to the plurality of first objects and the second object; and
an input interface configured to accept an input by a user for selecting and moving one of the plurality of first objects to an arbitrary position on the board, the method comprising executing the computer-readable instructions on the processor the steps of:
  selecting one of the plurality of first objects based on the input by the user in the input interface;
  moving the selected first object to the arbitrary position based on the input by the user in the input interface; and
  displaying the second object on the display at an arrangement position including the arbitrary position of an adjacent series of ones of the plurality of the first objects when the object attribute information of the adjacent series of ones of the plurality of first objects have a first predetermined relationship, wherein the processor is configured to select one of the plurality of first objects and move the selected first object within a predetermined period of time and prohibit the input interface from accepting the input by the user for selecting and moving after the predetermined period of time passes, the processor is configured to cause the display to display the second object during the movement of the selected first object, and when the second object is displayed adjacent to another one of the plurality of first object on the display and when the object attribute information of the another one of the plurality of first objects has a second predetermined relationship with the object attribute information of the second object, the processor is configured to enlarge a size of the second object so as the display the second object at a position corresponding to the another one of the plurality of first objects.

12. The method according to claim 11, wherein the first predetermined relationship is a relationship in which the adjacent series of ones of the plurality of first objects have the same object attribute information.

13. The method according to claim 11, wherein the processor is configured to move another one of the plurality of first objects to a display position of the second object, and to display any of the plurality of first objects at the display position of the second object, and the object attribute information of the another one of the plurality of first objects and the object attribute information of the adjacent series of ones of the plurality of first objects are different from each other.

14. The method according to claim 11, wherein the second object is displayed when a number of the adjacent series of ones of the plurality of first objects is at least three.

15. A device comprising:
a display configured to display;
  a plurality of first objects,
  a second object that is different from the plurality of first objects, and
  a board on which the plurality of first objects are arranged;
a memory configured to store computer-readable instructions and object attribute information corresponding to the plurality of first objects and the second object;
an input interface configured to accept an input by a user for selecting and moving one the plurality of first objects to an arbitrary position on the board; and
a processor configured to execute the computer-readable instructions so as to:
  select one of the plurality of first objects based on the input by the user in the input interface;
  move the selected first object to the arbitrary position based on the input by the user in the input interface; and
  display the second object on the display at an arrangement position including the arbitrary position of an adjacent series of ones of the plurality of the first objects when the object attribute information of the adjacent series of ones of the plurality of first objects have a predetermined relationship, wherein the processor is configured to select one of the plurality of first objects, move the selected first object within a predetermined period of time, and prohibit the input interface from accepting the input by the user for selecting and moving after the predetermined period of time passes, the processor is configured to cause the display to display the second object during the movement of the selected first object, and the processor is configured to delete the displayed second object from the display when the processor detects termination of the movement of the one of the plurality of first objects.

16. The terminal device according to claim 15, wherein the processor is configured to provide a predetermined effect to the user or a game character operable by the user according to the deletion of the second object.

17. The terminal device according to claim 16, wherein the processor is configured to provide an effect according to an area size of the deleted second object.

18. A computer program product embodying computer-readable instructions stored on a non-transitory computer-readable storage medium for causing a computer to execute a process by a processor, the computer comprising:
a display configured to display:
a plurality of first objects,
a second object that is different from the plurality of first objects, and
a board on which the plurality of first objects are arranged;
a memory configured to store object attribute information corresponding to the plurality of first objects and the second object; and
an input interface configured to accept an input by a user for selecting and moving one of the plurality of first objects to an arbitrary position on the board, the computer configured to perform the steps of:
selecting one of the plurality of first objects based on the input by the user in the input interface;
moving the selected first object to the arbitrary position based on the input by the user in the input interface; and
displaying the second object on the display at an arrangement position including the arbitrary position of an adjacent series of ones of the plurality of the first objects when the object attribute information of the adjacent series of ones of the plurality of first objects have a predetermined relationship,
wherein the processor is configured to select one of the plurality of first objects and move the selected first object within a predetermined period of time and prohibit the input interface from accepting the input by the user for selecting and moving after the predetermined period of time passes, the processor is configured to cause the display to display the second object during the movement of the selected first object, and the processor is configured to delete the displayed second object from the display when the processor detects termination of the movement of the one of the plurality of first objects.

19. A method for causing a processor in a computer to execute a process, the computer including:
a display configured to display:
a plurality of first objects,
a second object that is different from the plurality of first objects, and
a board on which the plurality of first objects are arranged;
a memory configured to store computer-readable instructions and object attribute information corresponding to the plurality of first objects and the second object; and
an input interface configured to accept an input by a user for selecting and moving one of the plurality of first objects to an arbitrary position on the board,
the method comprising executing the computer-readable instructions on the processor the steps of:
selecting one of the plurality of first objects based on the input by the user in the input interface;
moving the selected first object to the arbitrary position based on the input by the user in the input interface; and
displaying the second object on the display at an arrangement position including the arbitrary position of an adjacent series of ones of the plurality of the first objects when the object attribute information of the adjacent series of ones of the plurality of first objects have a predetermined relationship,
wherein the processor is configured to select one of the plurality of first objects and move the selected first object within a predetermined period of time and prohibit the input interface from accepting the input by the user for selecting and moving after the predetermined period of time passes, the processor is configured to cause the display to display the second object during the movement of the selected first object, and the processor is configured to delete the displayed second object from the display when the processor detects termination of the movement of the one of the plurality of first objects.

* * * * *